United States Patent
Ichiryu et al.

(10) Patent No.: US 8,000,213 B2
(45) Date of Patent: Aug. 16, 2011

(54) OPTICAL DISC RECORDING/REPRODUCING APPARATUS

(75) Inventors: Dai Ichiryu, Osaka (JP); Mitsuru Sakai, Osaka (JP)

(73) Assignee: Panasonic Corporation, Osaka (JP)

( * ) Notice: Subject to any disclaimer, the term of this patent is extended or adjusted under 35 U.S.C. 154(b) by 49 days.

(21) Appl. No.: 12/667,092

(22) PCT Filed: Jun. 27, 2008

(86) PCT No.: PCT/JP2008/001681
§ 371 (c)(1),
(2), (4) Date: Dec. 29, 2009

(87) PCT Pub. No.: WO2009/004776
PCT Pub. Date: Jan. 8, 2009

(65) Prior Publication Data
US 2010/0195467 A1    Aug. 5, 2010

(30) Foreign Application Priority Data
Jun. 29, 2007    (JP) .................................. 2007-171351

(51) Int. Cl.
*G11B 7/00*    (2006.01)
(52) U.S. Cl. ............... 369/124.12; 369/47.27; 369/47.31
(58) Field of Classification Search ............. 369/124.12, 369/47.27, 47.31, 124.01, 124.15, 47.15, 369/47.18, 47.35, 53.34
See application file for complete search history.

(56) References Cited

U.S. PATENT DOCUMENTS

| 5,933,410 A | 8/1999 | Nakane et al. | |
| 6,396,787 B1 * | 5/2002 | Lee et al. | 369/59.18 |
| 6,459,664 B1 | 10/2002 | Yamada et al. | |
| 6,567,372 B2 | 5/2003 | Takamine et al. | |
| 2006/0120252 A1 | 6/2006 | Kanda et al. | |

FOREIGN PATENT DOCUMENTS

| JP | 2000-339702 | 12/2000 |
| JP | 2001-6190 | 1/2001 |
| JP | 2006-252059 | 9/2006 |
| WO | 2004/086385 | 10/2004 |

OTHER PUBLICATIONS

International Search Report issued Oct. 7, 2008 in counterpart International Application No. PCT/JP2008/001681.
Translation of the Written Opinion of the ISA (PCT/ISA/237) issued Oct. 7, 2008 in counterpart International Application No. PCT/JP2008/001681.

* cited by examiner

*Primary Examiner* — Nabil Z Hindi
(74) *Attorney, Agent, or Firm* — Wenderoth, Lind & Ponack, L.L.P.

(57) ABSTRACT

There is provided an optical disc recording/reproducing apparatus which can reduce the chip size using the high-miniaturization process and can enhance the detection accuracy. A signal which is obtained by amplitude-adjusting a header region in a reproduced signal detected by an optical pickup (1) is digitized, and peak detection or bottom detection from the reproduced signal in each of a first section and a second section in the header region is performed by detection circuits (9) to (12), respectively. Then, amplitude data in the first section and the second section are obtained by subtracters (13) and (14) from the detected values in the respective detection circuits. A difference in amplitude between the first section and the second section in the header region is obtained by a subtracter (15) based on the amplitude data, and the amplitude difference is outputted as an off-track error signal. The respective detection circuits (9) to (12) perform detection operations in the first and second sections, and hold the detection operations in the sections other than the first and second sections.

20 Claims, 9 Drawing Sheets

Fig.12

| VF01 | AM | PID1 | IED1 | PA1 | VFO2 | AM | PID2 | IED2 | PA2 | VF01 | AM | PID3 | IED3 | PA1 | VFO2 | AM | PID4 | IED4 | PA2 |
|------|----|----|----|----|----|----|----|----|----|----|----|----|----|----|----|----|----|----|----|
| 36 | 3 | 4 | 2 | 1 | 8 | 3 | 4 | 2 | 1 | 36 | 3 | 4 | 2 | 1 | 8 | 3 | 4 | 2 | 1 |
| | | Header1 | | | | | Header2 | | | | | Header3 | | | | | Header4 | | |

OPTICAL DISC RECORDING/REPRODUCING APPARATUS

TECHNICAL FIELD

The present invention relates to extraction of a track center control signal for an optical disc recording/reproducing apparatus which records data in a disc on which tracks are formed, and reproduces data from the disc.

BACKGROUND ART

In recent years, price competition of optical disc recording/reproducing apparatuses has heated up, and the demand for cost reduction of electronic parts such as LSI have been extremely increased. Effective means to achieve such cost reduction include an increase in integration density by process miniaturization and a reduction in space by reducing analog circuits.

Generally, a guide groove for guiding a beam spot of a light beam during data recording is formed on a recordable optical disc, and data are recorded along this guide groove. The guide groove is wobbled with a specific frequency to generate a reference clock for controlling the number of rotations of the disc. There is a land/groove recording system DVD-RAM in which data is recorded in each of a land and a groove, as one of large-capacity recording media. A land track and a groove track are alternately replaced with each other to form a single track from the inner circumference of the disc toward the outer circumference thereof. Further, the land track and the groove track are composed of sectors that are divided at a predetermined length, and a header region formed of pits, which is called CAPA (Complementary Allocated Pit Address), is located at the beginning of each sector. This pit sequence is located at an intermediate position between the land track and the groove track as shown in FIG. 11(a). The header region comprises a VFO (Variable Frequency Oscillator) and sector addresses as shown in FIG. 12. VFO1 in Header1 and Header3 is recorded with a single frequency, and it is used for pulling in a PLL (Phase Locked Loop). The disc is divided into several zones in its radial direction, and the number of sectors per track in each zone is constant. The number of sectors per track is increased from the zone at the inner circumference toward the zone at the outer circumference.

Data recording and reproduction should be performed after the number of rotations of the disc is controlled to the number of rotations suited to each zone. Accordingly, the linear velocity in each zone is approximately constant. A region other than the header region is a recording region in which data can be rewritten.

Detection of a track deviation amount for tracking control will be described. Although this track deviation amount is obtained from the reflected light from the disc, generally tracking servo is performed using a push-pull tracking error signal (hereinafter "tracking error" is referred to as "TE") which occupies a relative positional error between the spot of the light beam and the center of the track. The TE signal includes not only a residual position error but also a lens shift disturbance corresponding to a relative positional deviation between the optical pickup body and the objective lens, a difference between the inner and outer circumferences due to a radial tilt, an error due to learning accuracy, and the like. As a means for correcting the lens shift disturbance, there is a method of generating an off-track error signal indicating a relative positional error between the beam spot of the light beam and the CAPA to enhance the accuracy of tracking servo. For example, a deviation between the beam spot and the track can detected by detecting a difference between the VFO1 signal amplitudes of the header 1 and the header 3 in the total reflection light amount signal (refer to Patent Document 1). FIG. 13 shows an example of a configuration of a conventional optical disc recording/reproducing apparatus.

The conventional optical disc recording/reproducing apparatus shown in FIG. 13 comprises an optical pickup 101, an adder 104, a variable amplifier 105, an offset voltage adjustment circuit 106, a switch 107, a HPF 108, a full-wave rectifying circuit 109, a LPF 110, a gate generation circuit 111, sample/hold (S/H) circuits 112 and 113, and a difference signal circuit 114. The optical pickup 101 comprises a light-receiving element 102 which is divided into four areas along the track tangential direction and the disc radial direction, and converts the received light amounts detected by the respective areas into current values, and four I/V conversion amplifiers 103 which convert the current values supplied from the respective areas of the light-receiving element 102 into voltage values.

A description will be given of the operation of the conventional optical disc recording/reproducing apparatus configured as described above.

The TE signals outputted from the pickup 101 are added by the adder 104, and the resultant amplitude of the header region is adjusted by the variable amplifier 105. At this time, the signal of the amplitude-adjusted header region is adjusted by the offset voltage adjustment circuit 106 so as to fall within the dynamic range.

On the other hand, a gate signal for extracting a reproduction signal in the header region is generated by the gate generation circuit 111, and the reproduction signal in the header region is extracted from the output signal of the variable amplifier 105 by the switch 107. Then, the extracted signal in the header region is AC-centered by the HPF 108, and the AC-centered reproduction signal in the header region is full-wave-rectified by the full-wave rectifying circuit 109. The full-wave-rectified reproduction signal in the header region is integrated by the LPF 110 to be input to the S/H circuits 112 and 113.

In the header-region signal that is integrated by the LPF 110, the amplitude data in the Header1 region is sampled and held by the S/H circuit 112, while the amplitude data in the Header3 region is sampled and held by the S/H circuit 113.

A difference signal between the Header1 amplitude data and the Header3 amplitude data which are sampled and held by the S/H circuits 112 and 113, respectively, is obtained by the difference signal circuit 114, and this difference signal is outputted as an off-track error signal. The off-track error signal can be used for tracking servo control including lens shift disturbance.

In this way, the off-track error signal for detecting a deviation between the beam spot and the track is extracted.
Patent Document 1: Japanese Published Patent Application No. 2001-6190

DISCLOSURE OF THE INVENTION

Problems to be Solved by the Invention

In the conventional optical disc recording/reproducing apparatus, however, when it is configured by analog circuits to detect an off-track error signal from amplitude data in headers, even if it is tried to reduce the chip size using the miniaturization process, the sizes of the analog circuits are not reduced in proportion to the process rule, resulting in a restriction on chip-size reduction.

Further, while in the conventional optical disc recording/reproducing apparatus the amplitude data in the header region is sampled and held using the S/H circuit, the capacitance value (size) of the S/H circuit is determined to realize high-speed sampling, which causes an increase in the offset voltage during holding. Further, since the output signal from the S/H circuit is amplified to be used as an error signal, the random offset voltage of the S/H circuit causes a significant error. While the track center control performs the averaging process at a low frequency band including the error factor of the S/H circuits, the averaging process might cause a restriction on the control frequency band at a high-rate speed.

The present invention is made to solve the above-described problems and has for its object to provide an optical disc recording/reproducing apparatus which can reduce the chip size using the miniaturization process, and can enhance the detection accuracy.

Measures to Solve the Problems

In order to solve the above-described problems, an optical disc recording/reproducing apparatus relating to Claim 1 of the present invention comprises: an optical pickup which applies a spot of light beam to an optical disc of a land/groove recording system including a first header region that is formed at a position shifted toward one side of a direction perpendicular to a track and a second header region that is formed at a position shifted toward the opposite side from the first header region, and detects reproduced signals from the reflected light beam; a first adder which adds the reproduced signals detection by the optical pickup; a variable amplifier which performs amplitude adjustment for a header region of the added reproduced signal; an offset voltage adjustment circuit which performs adjustment so that the signal in the amplitude-adjusted header region falls within a dynamic range; an A/D converter which converts the output signal from the variable amplifier into a digital signal; peak detection circuits which detect peak values of the reproduced signals in a first section and a second section in the header region, respectively; bottom detection circuits which detect bottom values of the reproduced signals in the first section and the second section in the header region, respectively; a first subtracter which obtains amplitude information in the first section and the second section in the header region, from the peak values and the bottom values which are detected in the first section and the second section by the respective detection circuits; a second subtracter which obtains a difference in amplitude between the first section and the second section in the header region, based on the amplitude information obtained by the first subtracter, and outputs the amplitude difference as an off-track error signal; a detection control timing generation circuit which generates a detection control timing for a detection section that is the first section or the second section in the header region, and replaces the detection control timings of the respective detection circuits at a switching between the land and the groove; wherein the respective detection circuits hold the detected values obtained by the previous detection operations in sections other than the detection section under the control of the detection control timing generation circuit.

Further, according to Claim 2 of the present invention, in the optical disc recording/reproducing apparatus defined in Claim 1: each of the respective detection circuits, on a condition that a PLL for a clock generated from a wobble is locked and addresses are being read when an ID gate signal for identifying a header region deviates from an actual header region at the detection control timing, updates the detected value by performing a detection operation when said condition is satisfied, and maintains the held value as a detected value when said condition is not satisfied.

Further, according to Claim 3 of the present invention, in the optical disc recording/reproducing apparatus defined in Claim 1: each of the respective detection circuits, on a condition that a signal which is obtained by adding, by an OR gate, signals which are obtained by binarizing the first section and the second section is used as a gate signal for judgment for the optical disc which is divided into plural zones, in which the first section and second section are arranged not adjacent to each other at a zone boundary, and the gate signal for judgment indicates that headers are present in predetermined sections from the first section to the second section, updates the detected value by performing a detection operation when said condition is satisfied, and maintains the held value as a detected value when said condition is not satisfied.

Further, according to Claim 4 of the present invention, in the optical disc recording/reproducing apparatus defined in Claim 1: each of the respective detection circuits, on a condition that the polarity of a header polarity judgment signal that is obtained from a difference signal of tracking error is inverted when the signal used for distinguishing between the land and the groove deviates, updates the detected value by performing a detection operation when said condition is satisfied, and maintains the held value as a detected value when said condition is not satisfied.

Further, according to Claim 5 of the present invention, in the optical disc recording/reproducing apparatus defined in any of Claims 1 to 4: each of the detection circuits has a function of offsetting a detected value toward a droop response direction from the held value upon each time of starting the detection operation.

Further, according to Claim 6 of the present invention, in the optical disc recording/reproducing apparatus defined in Claim 5: each of the detection circuits has a function of individually setting an offset value toward the droop response direction, in the first header region after a switching between the land and the groove.

Further, according to Claim 7 of the present invention, in the optical disc recording/reproducing apparatus defined in any of Claims 1 to 6: each of the detection circuits maintains the held value as a detected value in a drop-out state where data drops from the reproduced RF signal.

Further, according to Claim 8 of the present invention, the optical disc recording/reproducing apparatus defined in Claim 1 further includes: a first comparator which compares the output of the first section peak detection circuit with the output of the second section peak detection circuit to output the higher peak value; a second comparator which compares the output of the first section bottom detection circuit with the output of the second section bottom detection circuit to output the lower bottom value; a second adder which calculates an average value of the output value from the first comparator and the output value from the second comparator; and an offset control circuit which controls the offset voltage adjustment circuit based on the output value from the first comparator, the output value from the second comparator, and the output value from the second adder; wherein the set value of the offset control circuit is adjusted in association with the gain of the variable amplifier to make the control frequency band constant independently of the gain.

Further, according to Claim 9 of the present invention, the optical disc recording/reproducing apparatus defined in Claim 8 further includes: an updation timing generation circuit which controls the offset control circuit so as to update the offset control in a section other than the header region.

Further, according to Claim 10 of the present invention, the optical disc recording/reproducing apparatus defined in Claim 1 further includes: a third adder which obtains an average value of the amplitude information in the first section and the second section in the header region, which amplitude information is obtained by the first subtracter, and outputs the average value as header amplitude information.

Further, according to Claim 11 of the present invention, the optical disc recording/reproducing apparatus defined in Claim 10 further includes: a gain control circuit which controls the gain of the variable amplifier, based on the header amplitude information outputted from the third adder; wherein setting of the offset control circuit is adjusted based on the set value of the gain control circuit to keep the offset control band constant.

Effects of the Invention

According to the present invention, an optical disc recording/reproducing apparatus comprises: an optical pickup which applies a spot of light beam to an optical disc of a land/groove recording system including a first header region that is formed at a position shifted toward one side of a direction perpendicular to a track and a second header region that is formed at a position shifted toward the opposite side from the first header region, and detects reproduced signals from the reflected light beam; a first adder which adds the reproduced signals detection by the optical pickup; a variable amplifier which performs amplitude adjustment for a header region of the added reproduced signal; an offset voltage adjustment circuit which performs adjustment so that the signal in the amplitude-adjusted header region falls within a dynamic range; an A/D converter which converts the output signal from the variable amplifier into a digital signal; peak detection circuits which detect peak values of the reproduced signals in a first section and a second section in the header region, respectively; bottom detection circuits which detect bottom values of the reproduced signals in the first section and the second section in the header region, respectively; a first subtracter which obtains amplitude information in the first section and the second section in the header region, from the peak values and the bottom values which are detected in the first section and the second section by the respective detection circuits; a second subtracter which obtains a difference in amplitude between the first section and the second section in the header region, based on the amplitude information obtained by the first subtracter, and outputs the amplitude difference as an off-track error signal; a detection control timing generation circuit which generates a detection control timing for a detection section that the first section or the second section in the header region, and replaces the detection control timings of the respective detection circuits at a switching between the land and the groove; wherein the respective detection circuits hold the detected values obtained by the previous detection operations in sections other than the detection section under the control of the detection control timing generation circuit. Therefore, the analog circuit scale can be significantly reduced by replacing the processings which have conventionally been performed by the analog circuits with digital processings, thereby realizing a reduction in the chip size using the high-miniaturization process.

Further, since the responsiveness which is not likely to follow noises can be realized while ensuring the follow-up performance, detection accuracy can be ensured against a signal of poor S/N ratio. Further, since holding of the detected values is performed by digital processing, advanced performance can be realized. Furthermore, since the detection variation is reduced, the detection accuracy can be enhanced by increasing the frequency band of the off-track error signal averaging process, thereby responding to a high-rate speed.

Furthermore, since the detection operation is controlled to be held when an irregular gate signal such as an ID gate signal deviating from the actual address position on the time axis is generated or when a defect such as a dropout occurs, the detection error can be minimized.

Furthermore, since the error factors such as variations of the pickup and the analog circuit and differences between the inner and outer circumferences can be absorbed by performing the offset control and the gain control for the detected values from the reproduced signal, the learning which has conventionally been performed can be dispensed with.

BRIEF DESCRIPTION OF THE DRAWINGS

FIG. 4 is a waveform diagram for explaining detection operation by an optical disc recording/reproducing apparatus according to a second embodiment of the present invention, wherein

FIG. 12 is a diagram illustrating a format of a header region in a DVD-RAM disc.

Figure 1:
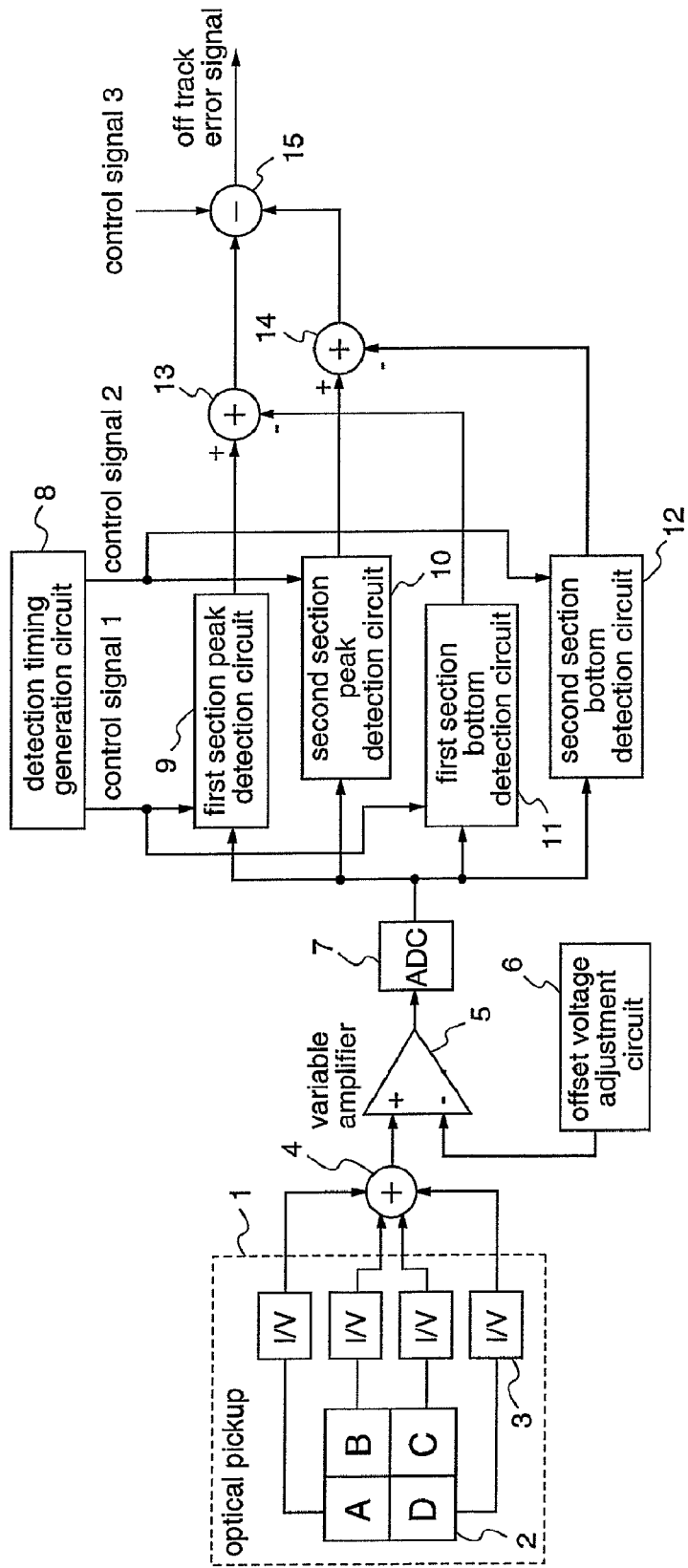
FIG. 1 is a block diagram illustrating a schematic configuration of an optical disc recording/reproducing apparatus according to a first embodiment of the present invention.

DESCRIPTION OF REFERENCE NUMERALS 1,101 . . . optical pickup
2,102 . . . light-receiving element
3,103 . . . I/V conversion amplifier
4,104 . . . adder
5,105 . . . variable amplifier
6,106 . . . offset voltage adjustment circuit
7 . . . AD converter
8 . . . detection timing generation circuit
9,10 . . . peak detection circuit
11,12 . . . bottom detection circuit 13,14 . . . subtracter
15 . . . subtracter
21,22 . . . comparator
23,31 . . . adder (average value output)
24 . . . offset control circuit
25 . . . updation timing generation circuit
41 . . . gain control circuit

BEST MODE TO EXECUTE THE INVENTION

Hereinafter, the best mode to execute the present invention will be described with reference to the drawings.

Embodiment 1

Hereinafter, an optical disc recording/reproducing apparatus according to a first embodiment of the present invention will be described.

Figure 11A:
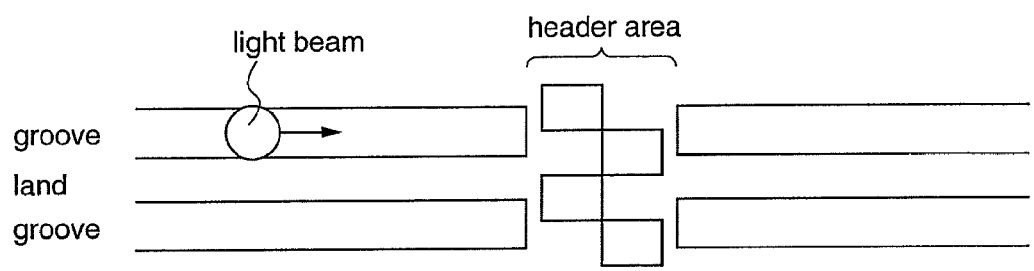
FIG. 11(a) is a diagram illustrating a header region on a track.
Figure 11B:
FIG. 11(b) is a diagram illustrating an RF waveform after addition of a TE signal.
Figure 13:
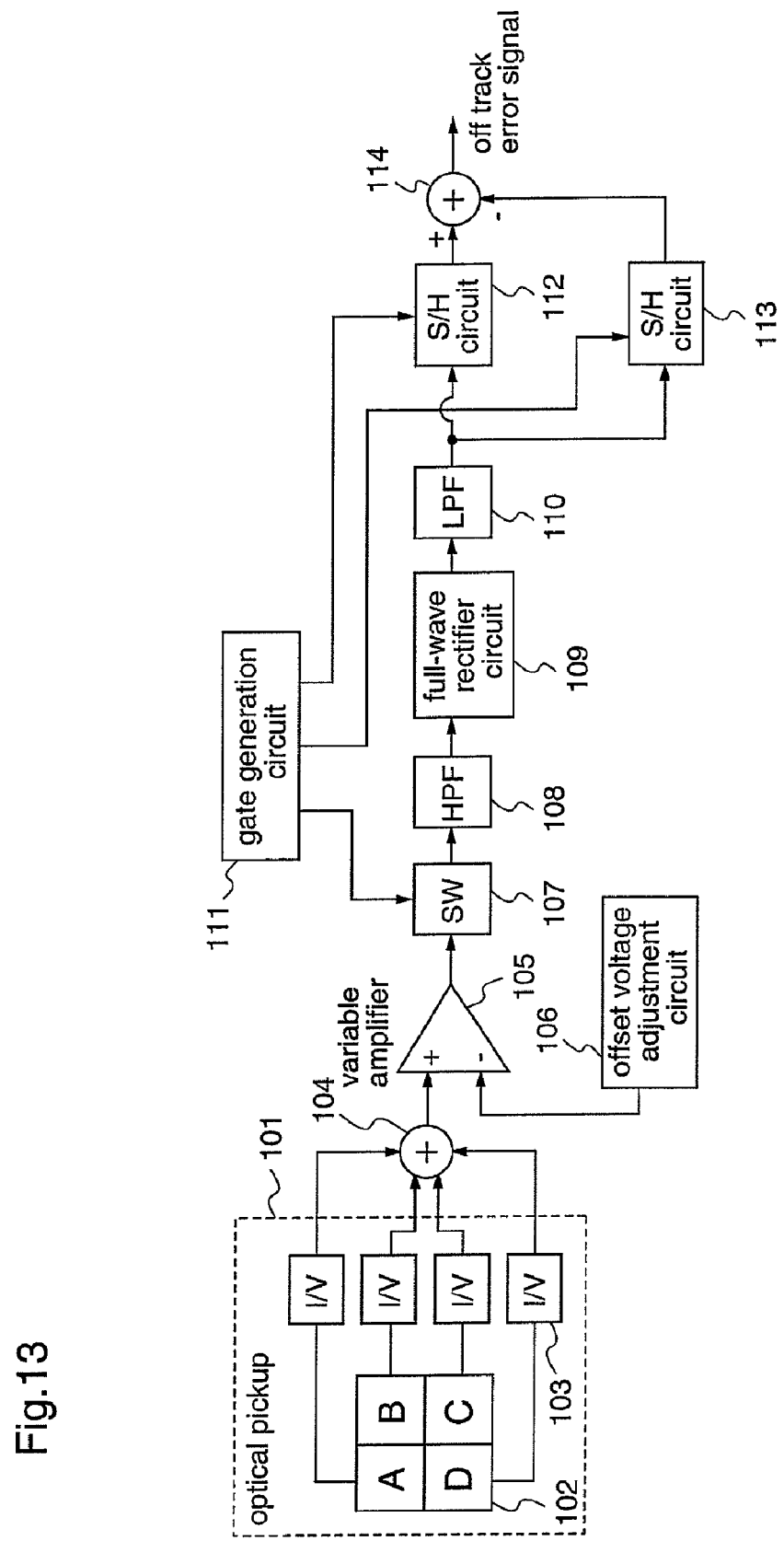
FIG. 13 is a block diagram illustrating a schematic configuration of a conventional optical disc recording/reproducing apparatus.

The optical disc recording/reproducing apparatus of the first embodiment records data in a land/groove recording type optical disc on which a land track and a groove track are alternately replaced with each other to form a single track from the inner circumference toward the outer circumference of the disc (e.g., DVD-RAM), and reproduces data from the optical disc. A header region formed of pits, which is called CAPA, is located at the beginning of each sector, and this pit sequence is arranged in an intermediate position between the land track and the groove track as shown in FIG. 11(a). FIG. 11(b) shows an RF signal obtained after the TE signals are added.

FIG. 1 is a block diagram illustrating the configuration of the optical disc recording/reproducing apparatus of the first embodiment.

The optical disc recording/reproducing apparatus of the first embodiment comprises an optical pickup 1, an adder 4, a variable amplifier 5, an offset voltage adjustment circuit 6, an AD converter (ADC) 7, a detection control timing generation circuit 8, peak detection circuits 9 and 10, bottom detection circuits 11 and 12, and subtracters 13, 14, and 15. The optical pickup 1 comprises a light-receiving element 2 which is divided into four areas along the track tangential direction and the disc radial direction, and converts the received light amounts detected in the respective areas into current values, and four I/V conversion amplifiers 3 which convert the current values supplied from the respective areas of the light-receiving element 2 into voltage values.

A description will be given of the operation of the optical disc recording/reproducing apparatus of the first embodiment configured as described above.

TE signals outputted from the pickup 1 are added by the adder 4, and the resultant amplitude in the header region is adjusted by the variable amplifier 5. At this time, the amplitude-adjusted signal in the header region is adjusted by the offset voltage adjustment circuit 6 so as to fall within the dynamic range.

The RF signal outputted from the variable amplifier 5 is converted into a digital value by the ADC 7, and a peak value and a bottom value in the first section of the header region (Header1) are detected by the peak detection circuit 9 and the bottom detection circuit 11, respectively, and a peak value and a bottom value in the second section of the header region (Header3) are detected by the peak detection circuit 10 and the bottom detection circuit 12, respectively.

The peak value and the bottom value which are detected in the first section of the header region are subjected to subtraction by the subtracter 13, and the subtraction result is outputted as amplitude data. Further, the peak value and the bottom value which are detected in the second section of the header region are subjected to subtraction by the subtracter 14, and the subtraction result is outputted as amplitude data.

A difference in the amplitude data between the first section and the second section in the header region which are obtained by the subtracters 13 and 14 is obtained by the subtracter 15, and this difference is outputted as an off-track error signal. This off-track error signal is used for tracking servo control including lens shift disturbance.

The detection control timing generation circuit 8 generates detection control signals (detection control timings) for controlling the detection operations of the peak detection circuits 9 and 10 and the bottom detection circuits 11 and 12, and controls these circuits to perform the detection operations in the detection control sections and hold the detected values obtained by the previous detection operations in the sections other than the detection control sections. In this first embodiment, the detection control sections are VFO1 sections in Header1 and Header3.

FIG. 12 is a diagram illustrating the structure of a header field in a DVD-RAM disc, illustrating a data structure forming one sector, and the sizes (bytes) of the respective areas. VFO (Variable Frequency Oscillator) is formed of a 4T signal pattern, and a bit clock for PLL lock is generated by this signal. This is used for clock reproduction. AM (Address Mark) is an address mark signal, and PID (Physical ID) is a sync signal for finding the beginning. Each of PID1 to PID4 is 4-byte data, and the first 1 byte indicates the sector data while the remaining 3 bytes indicates the sector number. IED (ID Error Detection code) is an error detection code for each PID. PA (Postamble) is one for identifying the demodulation state of data just before the PA. These address data are important for reproduction control.

Hereinafter, the characteristics of this first embodiment will be described.

Figure 2:
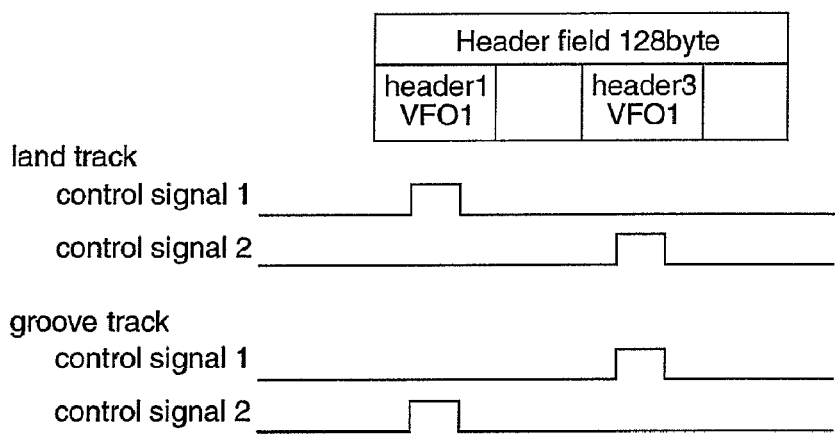
FIG. 2 is a timing chart for explaining detection control according to the first embodiment.

In this first embodiment, in order to detects the amplitude data in the VFO1 sections in the Header1 and Header3 in the header field, the detection control timing generation circuit 8 generates ID gate signals which become "High" in the VFO1 sections in the Header1 and Header3 regions, respectively, and generates the control signals 1 and 2 as shown in FIG. 2 from the ID gate signals, thereby to control the detection operations of the respective detection circuits. The detection control timings for the respective detection circuits are replaced at the time of switching between the land and the groove. That is, the control signal 1 is a signal which becomes "High" in the VFO1 section in the Header1 region in the land track, and becomes "High" in the VFO1 section in the Header3 region in the groove track. The control signal 2 is a signal which becomes "High" in the VFO1 section in the Header3 region in the land track, and becomes "High" in the VFO1 section in the Header1 region in the groove track.

The first section peak detection circuit 9 and the first section bottom detection circuit 11 perform the detection operation when the control signal 1 is "High", and the second section peak detection circuit 10 and the second section bottom detection circuit 12 perform the detection operation when the control signal 2 is "High". Further, when the control signal 1 or the control signal 2 is "Low", the detection circuits hold the just previous detected values, i.e., the detected values in the previous header regions, and continue the detection operation when the signal is switched to "High".

Further, in this first embodiment, the polarity of the subtracter 15 which outputs the off-track error signal is changed using a control signal 3 for distinguishing between the land track and the groove track, which is externally inputted. Thereby, the amplitude data difference in the final output can keep the polarity of "amplitude in VFO1 section in Header1 region—amplitude in VFO1 section in Header3 region" regardless of the land/groove. Therefore, the obtained amplitude data difference can be used for tracking servo control with its unchanged polarity.

By the way, in order to realize followability and responsiveness that does not follow noise, a restriction might occur as the following performance of the detection operation within the detection section range in the header region in one sector. As shown in FIG. 11(a), the Header1 and the Header3 are arranged symmetrically with respect to the center of the track, and their positions in the land and the groove are inverted with respect to the center of the track, and thereby the DC levels of the Header1 and the Header3 in the RF signal waveform after added are inverted. The DC levels and amplitudes of the Header1 and the Header3 are varied due to an off-track which is caused by a lens shift disturbance corresponding to a relative positional error between the optical pickup body and the objective lens or a difference between the inner and outer circumferences due to a radial tilt. Particularly, variations in the peak value and the bottom value occur upon each switching between the land and the groove, and it might be impossible to follow these variations within the VFO1 section of the Header1 or Header3 in one sector.

Figure 3:
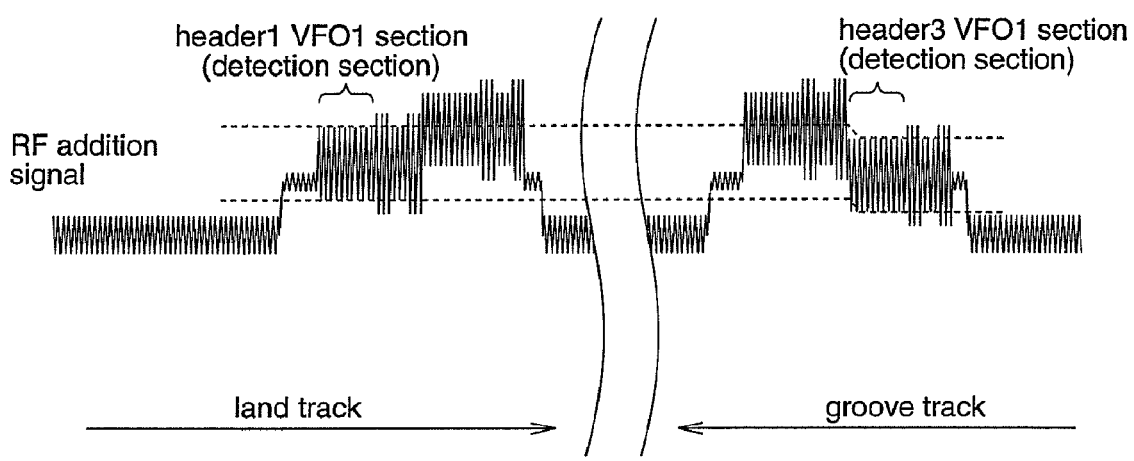
FIG. 3 is a waveform diagram for explaining detection operation according to the first embodiment.

So, in this first embodiment, a detection operation as shown in a waveform diagram of FIG. 3 is performed using a control signal 3 for distinguishing between the land track and the groove track, which signal is externally inputted. FIG. 3 shows a header-region addition waveform in the off-track state, and detected-value following waveforms of the first-section peak detection circuit 9 and the first-section bottom detection circuit 11 at land/groove switching. By performing switching from detection for the VFO1 section in the Header1 region in the land track to detection for the VFO1 section in the Header3 region in the groove track, the variation amount of the detected value from the previous held value is reduced. Accordingly, the peak detection circuit 9 and the bottom detection circuit 11 can perform the detection operations in the state where the variations in the detected values are eased at the switching between the land and the groove when an off-track occurs, and thus the detection accuracy can be enhanced by the reliable follow-up.

As described above, according to the optical disc recording/reproducing apparatus of the first embodiment, the circuits performing detection control, i.e., the detection control timing generation circuit 8, the peak detection circuits 9 and 10, the bottom detection circuits 11 and 12, and the subtracters 13, 14 and 15, are digitized, and a detection operation is performed in the VFO1 section in the Header1 region and the VFO1 section in the Header3 region while the detection operation is controlled to be held in the sections other than the above-mentioned sections. Therefore, the circuit scale can be significantly reduced using the high miniaturization process or the like, and further, the responsiveness that is not likely to follow noises can be realized while ensuring the follow-up performance.

Embodiment 2

Hereinafter, an optical disc recording/reproducing apparatus according to a second embodiment of the present invention will be described.

The optical disc recording/reproducing apparatus of this second embodiment is different from the first embodiment in the control operations of the peak detection circuit and the bottom detection circuit.

Figure 4A:
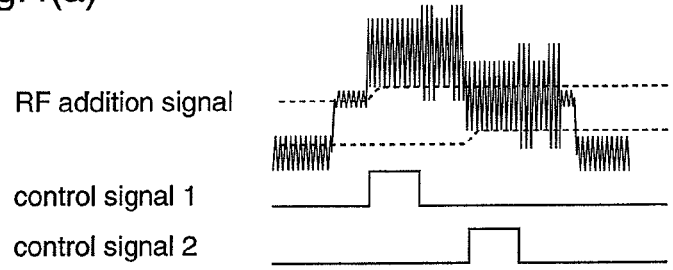
FIG. 4(a) shows a waveform at the time of updation of a detected value.

FIG. 4 is a diagram for explaining the detection operation performed by the optical disc recording/reproducing apparatus of the second embodiment, wherein 4(a) shows a waveform obtained when updating a detected value, and 4(b) shows a waveform obtained when a held value in the detection circuit is updated as it is.

Figure 4B:
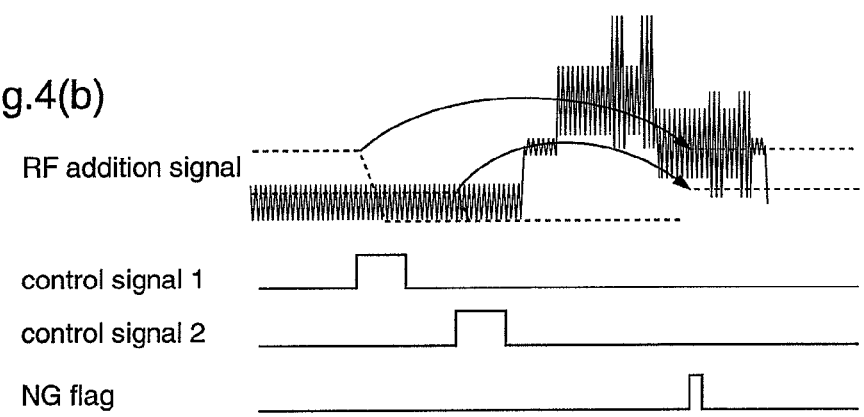
FIG. 4(b) shows a waveform during detection holding operation.

The peak detection circuits 9 and 10 and the bottom detection circuits 11 and 12 perform the detection operations in the detection operation sections, i.e., the VFO1 sections in the Header1 and Header3, and hold the just previously detected values in the sections other than the detection operation sections, as described for the first embodiment. Further, in this second embodiment, when the detection control timing deviates from the detection operation section, an NG flag is set as shown in FIG. 4(b). That is, when it is detected that the positions where the control signal 1 and the control signal 2 become "High" deviate from the VFO1 sections in the Header1 and Header3, the NG flag signal is set to "High". Then, the detected values are returned to the values that have been held in the respective detection circuits at the timing when the NG flag becomes "High", and the held values are maintained as they are.

Hereinafter, the characteristics of the second embodiment will be described.

Although the control signal 1 and the control signal 2 are generated from the ID gate signal as described for the first embodiment, if the ID gate signal deviates from the actual address position on the time axis, there occurs a problem that the ID gate signal might follow not the VFO1 in the header region but the section other than the VFO1 in the header region, i.e., the RF signal in the recording region. In this case, during the period when the ID gate signal deviates from the actual address position on the time axis, the amplitude data is outputted for the amplitude of the RF signal, which might cause false detection, false control of tracking, and the like. For example, although the ID gate signal is generated at the frequency timing of the clock immediately before seeking, since the operation is performed with the clock immediately before the seeking until the clock varies after the seeking to lock the PLL, the timing of the ID gate signal might not coincide with the actual header region due to the variation in the clock before and after the seeking.

So, in this first embodiment, it is judged whether the ID gate signal coincides with the position of the actual header region or not, based on 1) whether the PLL of the clock generated from the wobble is locked or not, and 2) whether the addresses are being read or not. That is, if any of these conditions is not satisfied, the detection operation is controlled not to follow the detected value in the section other than the VFO1 section in the header region. Thereby, the detection operation can be controlled to be held, and when the addresses cannot be read due to PLL variation immediately after long-distance seeking, an off-track error signal can be extracted without false detection.

Figure 5:
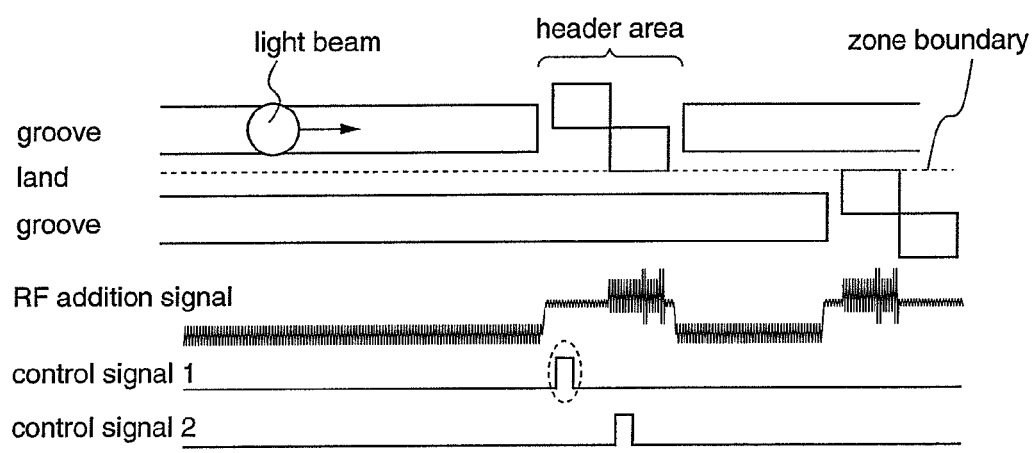
FIG. 5 is a diagram illustrating a zone boundary on a track.

Further, in the tracks on the both sides of the zone boundary, the addresses can be substantially formed on only one side to avoid an interference of both tracks, and there might occur an irregular case that the PLL is locked by only the header region on one side to recognize that the addresses are being read. In this case, the ID gate signal is generated as usual. At this time, since the signal exists only in the one-side header region while the corresponding signal does not exist in the other-side header region VFO1, false detection might occur. FIG. 5 is a diagram for explaining the detection operation at the zone boundary. Since, at the zone boundary, the Header1 and the Header3 are not located at the adjacent positions, and the control signal becomes "High" in the section other than the header region, which might cause false detection. Accordingly, it is necessary to add a condition so as to perform hold control without performing detection operation in the corresponding section.

So, in this second embodiment, the signals obtained by binarizing the signals in the Header1 region and the Header3 region from the RF push-pull signal are added by the OR gate, and the resultant addition signal is used as a gate signal for judging the actual header region. Then, it is determined as a condition for performing detection operation that the gate signal for header region judgment should be "High" in a predetermined section where the VFO1 sections are included in the header regions from the Header1 region to the Header3 region, that is, 3) the detection control timing exist in the predetermined section from the Header1 to the Header3. When this condition is satisfied, detection operation is carried out to update the values that have been held in the respective detection circuits. When the condition is not satisfied, hold control is performed so as not to perform detection follow-up in the section other than the VFO1 section in the header region. Thereby, an off-track error signal can be extracted without performing false detection for the header region that is positioned on only one side at the zone boundary.

Figure 6:
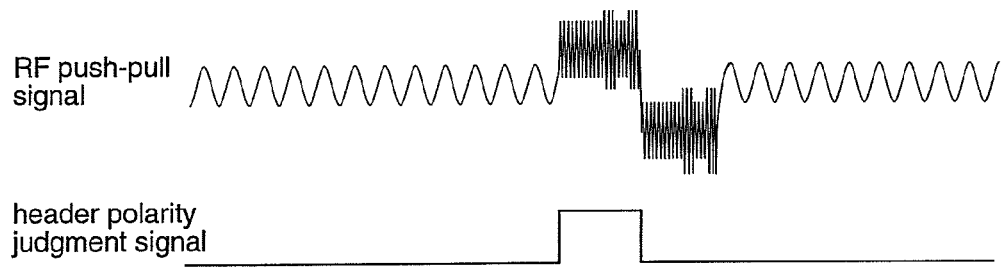
FIG. 6 is a waveform diagram illustrating a header polarity signal which is generated from an RF push-pull signal, according to the second embodiment.

Further, when the control signal 3 which distinguishes between the land track and the groove track deviates from the actual land/groove boundary, off-track error signals of different polarities might be outputted in the header regions at the land/groove boundary. On the other hand, as for the RF push-pull signal, since the polarities of the waveforms of the Header1 and the Header3 are inverted between the land and the groove, a header polarity judgment signal can be obtained. FIG. 6 shows the manner of generating the header polarity judgment signal from the RF push-pull signal.

In this second embodiment, if the header polarity is inverted at the switching between the land track and the groove track, it is judged that the control signal 3 coincides with the boundary, that is, it is determined as a condition for performing detection operation that 4) the control signal 3 for distinguishing between the land and the groove does not deviate from the boundary. When this condition is satisfied, the detection operation is performed to update the values which have been held in the respective detection circuits. When the condition is not satisfied, hold control is performed so as not to perform detection follow-up in the section other than the VFO1 section in the header region. Thereby, even in such irregular case where the control signal 3 for distinguishing between the land track and the groove track deviates, follow-up can be reliably carried out at switching between the land and the groove, and thereby an off-track error signal can be extracted without performing false detection.

Figure 7:
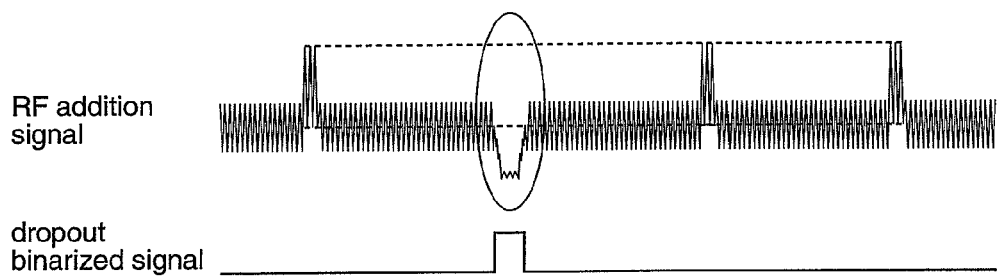
FIG. 7 is a waveform diagram for explaining detection operation at the time of dropout according to a third embodiment of the present invention.

Further, when the header region is overlapped with the drop-out state where data drops from the reproduced RF signal, since the detection control signal is generated based on the ID gate signal, the detection operation might follow the dropout portion to generate an error signal. Therefore, judgment should be performed according to a dropout signal which is detected not only in the recording region where data can be recorded but also in the header region, and the output of the detection circuit should be held when dropout occurs. FIG. 7 shows the waveforms of the RF addition signal and the detected signal when the detected value obtained when dropout occurs in the header region is controlled to be held. When dropout occurs, the dropout binarized signal becomes "High".

In this second embodiment, it is determined as a condition for performing detection operation that 5) no dropout occurs. When this condition is satisfied, detection operation is performed to update the values which have been held in the respective detection circuits. When the condition is not satisfied, that is, when dropout occurs, the previously detected values are held. Thereby, false detection due to occurrence of dropout is avoided, and detection follow-up can be reliably carried out even after the occurrence of dropout, and thus an off-track error signal can be extracted.

As described above, according to the optical disc recording/reproducing apparatus of the second embodiment, since the operation of continuously holding the previously detected values is performed against an irregular gate signal such as an ID gate signal deviating from the actual address position on the time axis, or a defect such as a dropout state, the detection error can be minimized.

Embodiment 3

Hereinafter, an optical disc recording/reproducing apparatus according to a third embodiment of the present invention will be described.

The optical disc recording/reproduction apparatus of the third embodiment is characterized in that the peak detection circuit and the bottom detection circuit are provided with follow-up functions in a droop response direction. The droop response direction is a direction along which the maximum value of the peak values and the minimum value of the bottom values which are held in the detection circuits are attenuated.

Hereinafter, the characteristics of the third embodiment will be described in comparison with the conventional detection circuit.

In the conventional detection circuit, the detection efficiency is determined by the ratio between the follow-up performance and the droop response performance, and the droop response performance must be decreased relative to the follow-up performance in order to maximize the detection accuracy for the target amplitude. However, there is a possibility that follow-up cannot be satisfactorily performed within the VFO1 section due to the poor followability in the droop response direction. Accordingly, in order to deal with variations of the Header1 and Header3 due to occurrence of off-track, the followability in the droop response direction must be improved.

On the other hand, in this third embodiment, in order to improve the droop responsiveness, a function of offsetting the detected value in the droop response direction with respect to the detected value in the previous sector is added, and the offset detected value is regarded as a detection starting position. Thereby, the droop responsiveness can be improved. Also when performing offset in the droop response direction, the followability of the peak detection or the bottom detection must satisfy the performance of follow-up within the VFO1 section. The offset level can be arbitrarily changed according to setting, and followability in response to an increase in speed can be realized.

Figure 8:
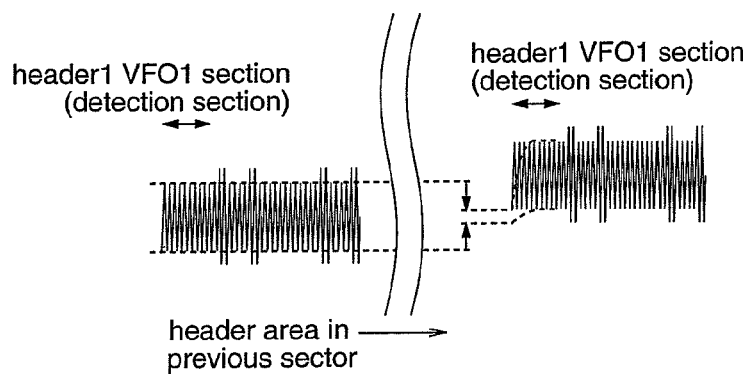
FIG. 8 is a waveform diagram for explaining detection operation by an optical disc recording/reproducing apparatus according to a third embodiment of the present invention.

FIG. 8 is an operation waveform diagram of the detection circuit according to the third embodiment.

FIG. 8 shows the followability of the detected peak values and bottom values in the Header1 VFO1 section to the offset operation and signal. It is found from this figure that, even when offset control is performed to the detected value in the previous sector at the timing before starting the detection and thereby the signal level in the header region is varied, the followability of the detected bottom value in the droop response direction is improved. Accordingly, reliable follow-up to the off-track variation can be realized, and thus the detection accuracy can be enhanced.

Further, there might occur a situation where the off-track amounts in the land and the groove become asymmetrical due to a positional deviation of the light beam spot caused by focus control or variations in the groove width and depth depending on the disc, which makes it necessary to consider a variation in the signal level in the header region at the land/groove boundary. When an off track occurs as described above, since the followability of the detected value varies constantly, sufficient follow-up cannot be performed within the VFO1 section if a DC variation of the signal component is added thereto.

In this third embodiment, considering the followability at the land/groove boundary, each detection circuit is provided with a function of individually setting an offset level in the first sector from land-to-groove switching or groove-to-land switching. Thereby, even when the off-track amounts in the land and the groove are asymmetrical, reliable follow-up can be realized to enhance the detection accuracy.

As described above, according to the optical disc recording/reproducing apparatus of this third embodiment, each of the respective detection circuits has the function of offsetting the detected value toward the droop response direction relative to the held value upon each time of starting the detection operation, and the function of individually setting an offset value toward the droop response direction in the first header region after a switching between the land and the groove. Therefore, the droop responsiveness can be improved, and further, even when the off-track amounts in the land and the groove become asymmetrical, reliable follow-up can be performed to enhance the detection accuracy.

Embodiment 4

Hereinafter, an optical disc recording/reproducing apparatus according to a fourth embodiment of the present invention will be described.

The optical disc recording/reproducing apparatus of this fourth embodiment is provided with a function of performing offset voltage adjustment for the RF signal in the header region according to the peak value and the bottom value, in addition to the constituents of the first embodiment.

Figure 9:
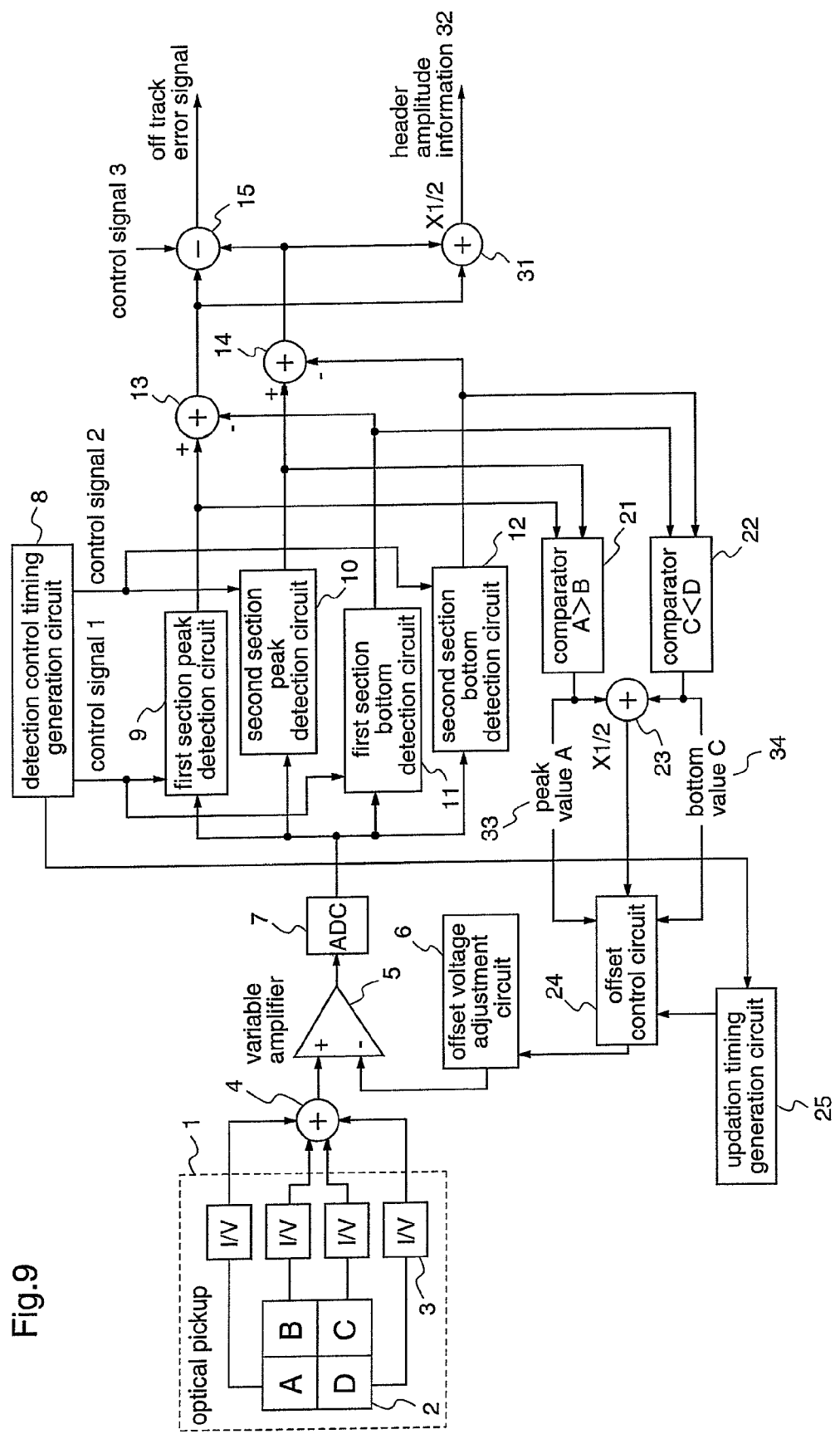
FIG. 9 is a block diagram illustrating a schematic configuration of an optical disc recording/reproducing apparatus according to a fourth embodiment of the present invention.

FIG. 9 is a block diagram illustrating the configuration of the optical disc recording/reproducing apparatus of the fourth embodiment.

The optical disc recording/reproducing apparatus of this fourth embodiment is provided with comparators 21 and 22, an adder 23, an offset control circuit 24, an updation timing generation circuit 25, and an adder 31, in addition to the constituents of the optical disc recording/reproducing apparatus of the first embodiment.

Next, the operation of the optical disc recording/reproducing apparatus of the fourth embodiment will be described.

The peak value detected by the first section peak detection circuit 9 and the peak value detected by the second section peak detection circuit 10 are compared by the comparator 21, and the higher peak value 33 is input to the offset control circuit 24. Further, the bottom value detected by the first section bottom detection circuit 11 and the bottom value detected by the second section bottom detection circuit 12 are compared by the comparator 22, and the lower bottom value 34 is input to the offset control circuit 24. An average of the output value 33 from the comparator 21 and the output value 34 from the comparator 22 is obtained by the adder 23, and the average value is input to the offset control circuit 24.

Based on the output value from the adder 23, the offset control circuit 24 controls the set value of the offset voltage adjustment circuit 6 so that its control frequency band becomes constant independently of the gain.

By the way, considering the dynamic ranges of the variable amplifier 5 and the AD converter 7 as the analog circuits, the offset voltage must be controlled so that the signal in the header region falls within the dynamic ranges. Although a method of setting an offset voltage value by performing learning can be adopted, this method has restrictions such as heavy software processing and long starting time.

In this fourth embodiment, the peak value and bottom value of the signal in the header region are detected, and automatic control is performed based on these data so that the signal in the header region falls within the dynamic range. For example, there is considered a method of controlling the offset voltage when the peak value A that is judged as the higher value by the comparator 21 or the bottom value C that is judged as the lower value by the comparator 22 exceeds a certain threshold value, or a method of performing feedback control so that the intermediate value between the peak value A and the bottom value C becomes the center of the dynamic range. Further, there is also considered a method of performing offset control at the input side or the output side of the variable amplifier 5 which performs amplitude adjustment for the header region. A similar effect can be obtained by any of these configurations. However, considering that the header region is level-shifted with respect to the reference voltage of the variable amplifier 5, the configuration of adjusting the offset voltage before performing amplification by the variable amplifier 5 has an advantage in accuracy over the bit restriction of the offset voltage adjustment. If the above-described automatic control is executed to adjust the offset voltage on the input side of the variable amplifier 5, the offset voltage setting must be performed considering the gain.

Further, when the above-described automatic control is executed, since the loop gain of the offset voltage control depends on the gain setting of the variable amplifier 5, the control band varies depending on the gain setting, which affects the detection accuracy. In this fourth embodiment, a function of adjusting the setting of the offset control circuit 24 is provided so as to make the loop gain of the offset voltage control constant in association with the gain setting of the variable amplifier 5. Thereby, automatic control in a constant frequency band is realized independently of the gain of the variable amplifier 5, and thus the signal in the header region can be included within the dynamic range.

Further, since the automatic control of the offset voltage should be performed to only the header region, continuous control including the data region is not necessary. However, if offset voltage setting is performed in the VFO1 section in the header region, a DC variation occurs during the detection operation, which causes a detection error. In this fourth embodiment, the updation timing generation circuit 25 is provided so as to perform offset voltage setting after passage of the header region only when the respective conditions described in the second embodiment, that is, 1) the PLL of the clock generated from the wobble is locked, 2) the addresses are being read, 3) the detection control timing exists in a predetermined section from Header1 to Header3, 4) the control signal 3 for distinguishing between the land and the groove does not deviate on the time axis, and 5) no drop out occurs, are satisfied in conjunction with the detection control timing described in the second embodiment, and the detected value is updated. Thereby, since the peak detection circuit and the bottom detection circuit are held in the sections other than the VFO1 section in the header region, the detection follow-up is not affected, and the detection operation follows a DC level variation after the offset voltage adjustment in the header region in the next sector. Accordingly, even if the detection circuit performs the hold operation when a defect such as an irregular gate signal or a dropout occurs, since the offset voltage automatic control is also held, false control of the offset voltage adjustment does not occur. Further, when the offset voltage setting is performed after passage of the header region, the apparatus can be realized without considering speed-up of the offset voltage adjustment circuit 6.

Furthermore, in order to absorb variations in the amplitudes and gains in the analog circuits such as the pickup and the variable amplifier, the amplitude of the header region must be normalized, and the amplitude of the signal to be input to the AD converter 7 must be adjusted so as to have a predetermined amplitude value.

Since the amplitude data in the Header1 and Header3 depend on the off track or the radial tilt, if the amplitude adjustment is executed in the state that is not the track center or the tilt center, a desired amplitude value might not be obtained at the time of the track center.

When the desired amplitude value is not obtained, there may occur a phenomenon that the control sensitivity is degraded or that the dynamic range in the analog circuit is exceeded. So, in this fourth embodiment, the gain of the variable amplifier 5 is changed while automatically controlling the offset voltage so that the amplitude data in the Header1 and Header3 fall within the dynamic range, by the offset control circuit 24 using the detected peak value 33 outputted from the comparator 21 and the detected bottom value 34 outputted from the comparator 22, and amplitude adjustment is performed with learning the amplitudes equivalent to those at the track center and the radial-tilt center. Thereby, even when an off track or a radial tilt occurs, amplitude learning can be performed with high accuracy.

As described above, according to the optical disc recording/reproducing apparatus of the fourth embodiment, since the offset voltage is automatically controlled so that the amplitude data in the Header1 and Header3 regions fall within the dynamic range, automatic control in a constant frequency band can be realized independently of the gain of the variable amplifier 5, and the signals in the header regions can be included within the dynamic range, thereby enhancing the detection accuracy.

Embodiment 5

Hereinafter, an optical disc recording/reproducing apparatus according to a fifth embodiment of the present invention will be described.

In this fifth embodiment, a function of automatically controlling the gain setting for the variable amplifier 5 is provided in addition to the configuration of the fourth embodiment.

Figure 10:
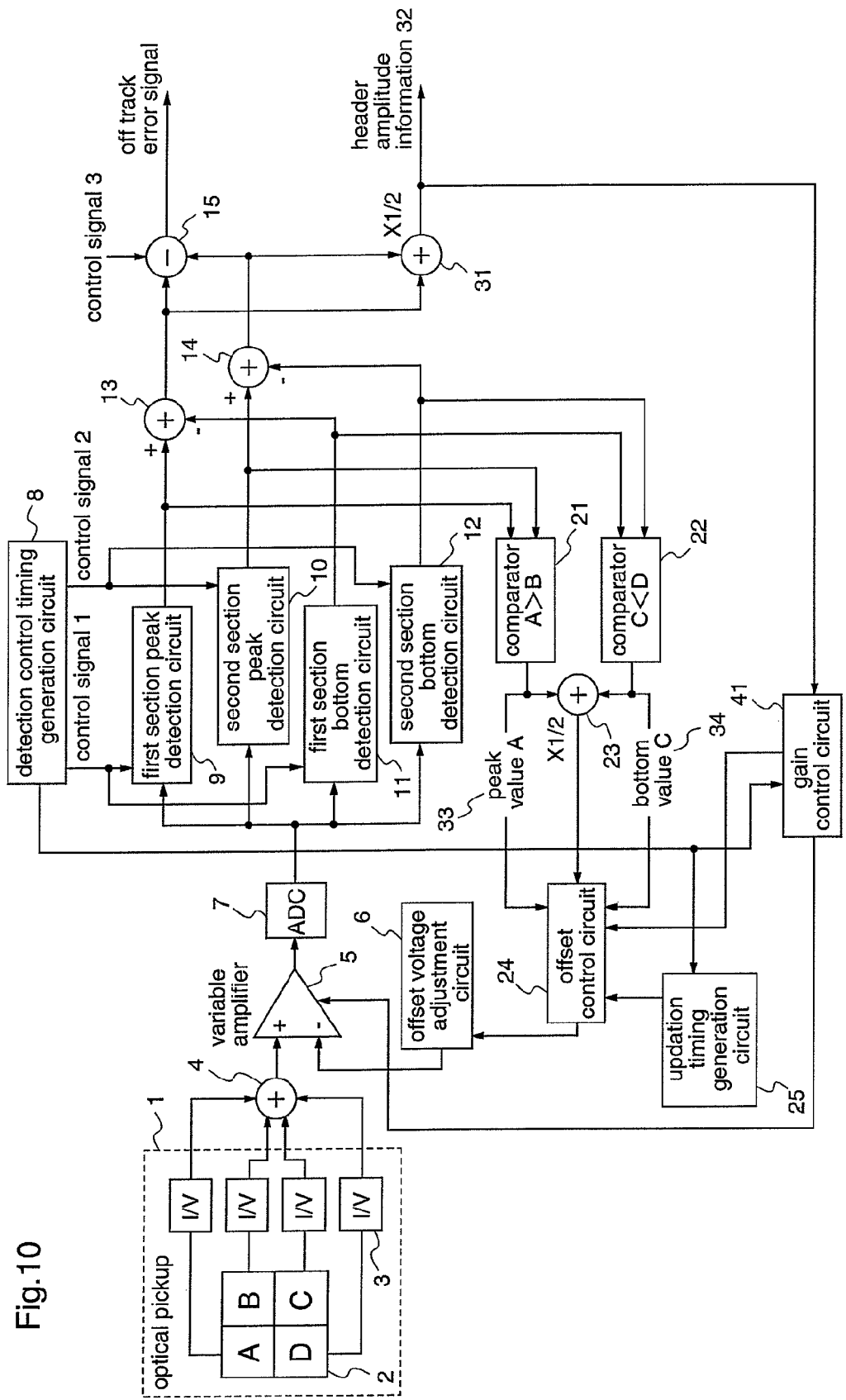
FIG. 10 is a block diagram illustrating a schematic configuration of an optical disc recording/reproducing apparatus according to a fifth embodiment of the present invention.

FIG. 10 is a block diagram illustrating the configuration of the optical disc recording/reproducing apparatus of the fifth embodiment.

The optical disc recording/reproducing apparatus of the fifth embodiment includes a gain control circuit 41 for automatically controlling the gain setting for the variable amplifier 5, in addition to the constituents of the optical disc recording/reproducing apparatus of the fourth embodiment shown in FIG. 9.

The operation of the optical disc recording/reproducing apparatus of the fifth embodiment will be described.

In the gain control circuit 41, an amplitude value to be controlled is calculated from the header amplitude data output 32, and gain control is executed in conjunction with the detection control timing described in the second embodiment. However, as described in the fourth embodiment, it is necessary to keep the control loop band constant by varying the offset voltage control amount by the offset control circuit according to the gain variation of the variable amplifier. When the amplitude is adjusted to a fixed amplitude value by learning, since there is an amplitude difference due to variation in the laser power at the inner and outer circumferences, the control sensitivity varies at the inner and outer circumferences. Since the amplitude is adjusted to that on the outer circumference side having a larger laser power with considering the dynamic range, the amplitude is reduced at the inner circumference, and the control sensitivity and the linearity might be degraded.

In this fifth embodiment, the gain control circuit 41 is added to keep the signal amplitude value in the header region constant. Therefore, variations in the amplitudes in the pickup and the analog circuits due to the temperature and variations in the amplitudes at the inner and outer circumferences are absorbed, thereby realizing off-track control with constant sensitivity.

As described above, according to the optical disc recording/reproducing apparatus of the fifth embodiment, since the gain setting for the variable amplifier 5 is automatically controlled, variations in the amplitudes in the pickup and the analog circuit due to the temperature and variations in the amplitudes at the inner and outer circumferences can be absorbed, and thereby off-track control with constant sensitivity can be realized, resulting in enhanced detection accuracy.

Applicability in Industry

An optical disc recording/reproduction apparatus of the present invention can be utilized as an optical disc recording/reproducing apparatus which can record data in a DVD-RAM disc at a high speed.

The invention claimed is:

1. An optical disc recording/reproducing apparatus comprising:
    an optical pickup which applies a spot of light beam to an optical disc of a land/groove recording system including a first header region that is formed at a position shifted toward one side of a direction perpendicular to a track and a second header region that is formed at a position shifted toward the opposite side from the first header region, and detects reproduced signals from the reflected light beam;
    a first adder which adds the reproduced signals detection by the optical pickup;
    a variable amplifier which performs amplitude adjustment for a header region of the added reproduced signal;
    an offset voltage adjustment circuit which performs adjustment so that the signal in the amplitude-adjusted header region falls within a dynamic range;
    an A/D converter which converts the output signal from the variable amplifier into a digital signal;
    peak detection circuits which detect peak values of the reproduced signals in a first section and a second section in the header region, respectively;
    bottom detection circuits which detect bottom values of the reproduced signals in the first section and the second section in the header region, respectively;
    a first subtracter which obtains amplitude information in the first section and the second section in the header region, from the peak values and the bottom values which are detected in the first section and the second section by the respective detection circuits;

a second subtracter which obtains a difference in amplitude between the first section and the second section in the header region, based on the amplitude information obtained by the first subtracter, and outputs the amplitude difference as an off-track error signal;

a detection control timing generation circuit which generates a detection control timing for a detection section that is the first section or the second section in the header region, and replaces the detection control timings of the respective detection circuits at a switching between the land and the groove; and said respective detection circuits holding the detected values obtained by the previous detection operations in sections other than said detection section under the control of the detection control timing generation circuit.

2. An optical disc recording/reproducing apparatus as defined in claim 1 wherein:

each of the respective detection circuits, on a condition that a PLL for a clock generated from a wobble is locked and addresses are being read when an ID gate signal for identifying a header region deviates from an actual header region at said detection control timing, updates the detected value by performing a detection operation when said condition is satisfied, and maintains the held value as a detected value when said condition is not satisfied.

3. An optical disc recording/reproducing apparatus as defined in claim 1 wherein:

each of the respective detection circuits, on a condition that a signal which is obtained by adding, by an OR gate, signals which are obtained by binarizing the first section and the second section is used as a gate signal for judgment for said optical disc which is divided into plural zones, in which said first section and second section are arranged not adjacent to each other at a zone boundary, and said gate signal for judgment indicates that headers are present in predetermined sections from the first section to the second section, updates the detected value by performing a detection operation when said condition is satisfied, and maintains the held value as a detected value when said condition is not satisfied.

4. An optical disc recording/reproducing apparatus as defined in claim 1 wherein:

each of the respective detection circuits, on a condition that the polarity of a header polarity judgment signal that is obtained from a difference signal of tracking error is inverted when the signal used for distinguishing between the land and the groove deviates, updates the detected value by performing a detection operation when said condition is satisfied, and maintains the held value as a detected value when said condition is not satisfied.

5. An optical disc recording/reproducing apparatus as defined in claim 1 wherein:

each of the respective detection circuits has a function of offsetting a detected value toward a droop response direction from the held value upon each time of starting the detection operation.

6. An optical disc recording/reproducing apparatus as defined in claim 5 wherein:

each of the respective detection circuits has a function of individually setting an offset value toward the droop response direction, in the first header region after switching between the land and the groove.

7. An optical disc recording/reproducing apparatus as defined in claim 1 wherein:

each of the respective detection circuits maintains the held value as a detected value in a drop-out state where data drops from the reproduced RF signal.

8. An optical disc recording/reproducing apparatus as defined in claim 1 further including:

a first comparator which compares the output of the first section peak detection circuit with the output of the second section peak detection circuit to output the higher peak value;

a second comparator which compares the output of the first section bottom detection circuit with the output of the second section bottom detection circuit to output the lower bottom value;

a second adder which calculates an average value of the output value from the first comparator and the output value from the second comparator; and an offset control circuit which controls the offset voltage adjustment circuit based on the output value from the first comparator, the output value from the second comparator, and the output value from the second adder;

wherein the set value of the offset control circuit is adjusted in association with the gain of the variable amplifier to make the control frequency band constant independently of the gain.

9. An optical disc recording/reproducing apparatus as defined in claim 8 further including:

an updation timing generation circuit which controls the offset control circuit so as to update the offset control in a section other than the header region.

10. An optical disc recording/reproducing apparatus as defined in claim 1 further including:

a third adder which obtains an average value of the amplitude information in the first section and the second section in the header region, which amplitude information is obtained by the first subtracter, and outputs the average value as header amplitude information.

11. An optical disc recording/reproducing apparatus as defined in claim 10 further including:

a gain control circuit which controls the gain of the variable amplifier, based on the header amplitude information outputted from the third adder;

wherein setting of the offset control circuit is adjusted based on the set value of the gain control circuit to keep the offset control band constant.

12. An optical disc recording/reproducing apparatus as defined in claim 2 wherein:

each of the respective detection circuits has a function of offsetting a detected value toward a droop response direction from the held value upon each time of starting the detection operation.

13. An optical disc recording/reproducing apparatus as defined in claim 3 wherein:

each of the respective detection circuits has a function of offsetting a detected value toward a droop response direction from the held value upon each time of starting the detection operation.

14. An optical disc recording/reproducing apparatus as defined in claim 4 wherein:

each of the respective detection circuits has a function of offsetting a detected value toward a droop response direction from the held value upon each time of starting the detection operation.

15. An optical disc recording/reproducing apparatus as defined in claim 12 wherein:
  each of the respective detection circuits has a function of individually setting an offset value toward the droop response direction, in the first header region after switching between the land and the groove.

16. An optical disc recording/reproducing apparatus as defined in claim 13 wherein:
  each of the respective detection circuits has a function of individually setting an offset value toward the droop response direction, in the first header region after switching between the land and the groove.

17. An optical disc recording/reproducing apparatus as defined in claim 14 wherein:
  each of the respective detection circuits has a function of individually setting an offset value toward the droop response direction, in the first header region after switching between the land and the groove.

18. An optical disc recording/reproducing apparatus as defined in claim 2 wherein:
  each of the respective detection circuits maintains the held value as a detected value in a drop-out state where data drops from the reproduced RF signal.

19. An optical disc recording/reproducing apparatus as defined in claim 3 wherein:
  each of the respective detection circuits maintains the held value as a detected value in a drop-out state where data drops from the reproduced RF signal.

20. An optical disc recording/reproducing apparatus as defined in claim 4 wherein:
  each of the respective detection circuits maintains the held value as a detected value in a drop-out state where data drops from the reproduced RF signal.

* * * * *